US008938480B2

(12) United States Patent
Xu

(10) Patent No.: US 8,938,480 B2
(45) Date of Patent: Jan. 20, 2015

(54) TECHNIQUES FOR FAST LOADING OF DATA FROM AN EXTERNAL DISTRIBUTED FILE SYSTEM TO A DATABASE MANAGEMENT SYSTEM

(75) Inventor: Yu Xu, Burlingame, CA (US)

(73) Assignee: Teradata US, Inc., Dayton, OH (US)

( * ) Notice: Subject to any disclaimer, the term of this patent is extended or adjusted under 35 U.S.C. 154(b) by 316 days.

(21) Appl. No.: 13/340,364

(22) Filed: Dec. 29, 2011

(65) Prior Publication Data

US 2013/0173615 A1 Jul. 4, 2013

(51) Int. Cl.
G06F 17/30 (2006.01)

(52) U.S. Cl.
USPC .......................................... 707/821; 707/825

(58) Field of Classification Search
CPC . Y10S 707/00; G06F 7/762; G06F 17/30557; G06F 17/30442; G06F 17/30445; G06F 17/30463
USPC .................................. 707/821, 825; 709/201
See application file for complete search history.

(56) References Cited

U.S. PATENT DOCUMENTS

| 5,544,357 | A  | * | 8/1996 | Huei | 707/715 |
|---|---|---|---|---|---|
| 6,018,746 | A  | * | 1/2000 | Hill et al. | 707/679 |
| 6,085,200 | A  | * | 7/2000 | Hill et al. | 1/1 |
| 6,289,334 | B1 | * | 9/2001 | Reiner et al. | 1/1 |
| 6,295,539 | B1 | * | 9/2001 | Isip, Jr. | 1/1 |
| 6,581,104 | B1 | * | 6/2003 | Bereiter | 709/232 |
| 6,728,716 | B1 | * | 4/2004 | Bhattacharya et al. | 1/1 |
| 6,879,984 | B2 | * | 4/2005 | Duddleson et al. | 1/1 |
| 7,337,176 | B1 | * | 2/2008 | Cheedella et al. | 1/1 |
| 7,814,232 | B2 | * | 10/2010 | Satapati et al. | 709/249 |
| 7,895,151 | B2 |   | 2/2011 | Shau | |
| 7,958,091 | B2 |   | 6/2011 | Nair et al. | |
| 8,060,542 | B2 | * | 11/2011 | Shankar et al. | 707/812 |
| 8,161,006 | B2 | * | 4/2012 | Kawamura | 707/640 |
| 8,194,664 | B2 | * | 6/2012 | Dharwadkar | 370/392 |
| 8,392,575 | B1 | * | 3/2013 | Marr | 709/226 |
| 8,510,409 | B1 | * | 8/2013 | Harris et al. | 709/217 |
| 8,745,264 | B1 | * | 6/2014 | Marr | 709/235 |
| 2002/0140731 | A1 | * | 10/2002 | Subramaniam et al. | 345/762 |
| 2002/0161748 | A1 | * | 10/2002 | Hamel et al. | 707/3 |
| 2003/0069902 | A1 | * | 4/2003 | Narang et al. | 707/203 |
| 2004/0078419 | A1 | * | 4/2004 | Ferrari et al. | 709/201 |
| 2004/0117438 | A1 | * | 6/2004 | Considine et al. | 709/203 |
| 2004/0133634 | A1 | * | 7/2004 | Luke et al. | 709/203 |
| 2005/0187983 | A1 | * | 8/2005 | Narang et al. | 707/200 |
| 2007/0208573 | A1 | * | 9/2007 | Malden et al. | 705/1 |
| 2007/0208858 | A1 | * | 9/2007 | Ra et al. | 709/227 |
| 2007/0266056 | A1 | * | 11/2007 | Stacey et al. | 707/203 |
| 2008/0306987 | A1 | * | 12/2008 | Chen et al. | 707/102 |
| 2009/0182472 | A1 | * | 7/2009 | Singh et al. | 701/50 |
| 2009/0319550 | A1 |   | 12/2009 | Shau et al. | |
| 2011/0099155 | A1 |   | 4/2011 | Shau et al. | |
| 2011/0246432 | A1 | * | 10/2011 | Yang et al. | 707/693 |

(Continued)

*Primary Examiner* — Hanh Thai

(74) *Attorney, Agent, or Firm* — Schwegman, Lundberg & Woessner, P.A.

(57) ABSTRACT

Techniques for fast loading data from an external distributed file system (DFS) to a database management system (DBMS) are provided. Assigning a portion of data from a file located in the DFS to each of a plurality of DFS clients. Configuring each DFS client to interact with a specific gateway from a plurality of gateways associated with the DBMS. Each gateway configured to send its portion of the file received from its designated client to every access module processor (AMP) controlled by that gateway. Each AMP processes a portion of the data received from the gateway to load the data into a table of the DBMS.

20 Claims, 4 Drawing Sheets

(56) References Cited

U.S. PATENT DOCUMENTS

2011/0302224 A1* 12/2011 Yairi et al. .................... 707/824
2011/0302226 A1* 12/2011 Abadi et al. ................... 707/825
2012/0150793 A1* 6/2012 Carroll .......................... 707/602

* cited by examiner

TECHNIQUES FOR FAST LOADING OF DATA FROM AN EXTERNAL DISTRIBUTED FILE SYSTEM TO A DATABASE MANAGEMENT SYSTEM

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry it mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

One challenge in integrating Hadoop™ architecture with an enterprise DBMS is loading data from Hadoop™ and importing and using that data within the enterprise DBMS.

Moreover, loading data quickly into data warehouses (parallel DBMS) is an important task in building and maintaining enterprise data warehouses. Historically, data warehouse loading tools have been mainly focused on single client loading data to data warehouse though through multiple concurrent sessions. In a shared parallel DBMS (PDBMS), multiple nodes communicate via high-speed interconnect network and each node has its own private memory and disk(s). In current systems, there are usually multiple virtual processors (collections of software processes) running on each node to take advantage of the multiple CPUs and disks available on each node for further parallelism. These virtual processors, responsible for doing the scans, joins, locking, transaction management, and other data management work, are called Parallel Units or Access Module Processors (AMPs) in Teradata DBMS.

Tables are usually horizontally partitioned across all PUs which allows the system to exploit the I/O bandwidth of multiple disks by reading and writing them in parallel. Hash partitioning is commonly used to partition relations across all PUs. Rows of a table are assigned to an AMP by applying a hash function to Primary Index Column (PI).

The Primary Index Column is one or more attributes from the table, specified by the user or automatically chosen by the system.

Loading data to a table in parallel DBMS with defined Primary Index column (PI) requires PDBMS to load data to the right parallel computing unit (AMP) based on the hash value of the table's PI column and further requires PDBMS to sort the data received by each parallel computing unit based on the hash values of the PI column for the purpose of being able to quickly look up qualified rows based on the PI column value later. Some recent data warehouse benchmarks show that a DBMS's No Primary Index (NoPI) table feature is about 30% faster than loading to a Primary Index (PI) table. A NoPI table is a table without defined Primary Index column. Thus when a row is inserted to the table, the row can be stored on any AMP. Consequently there is a no quick or efficient way to quickly find qualified rows based on Primary Index column since no Primary Index column is defined with a NoPI table. Loading to a NoPI table does not require sorting loaded data on each DBMS Access Module Processor (AMP), which is the main reason why it is faster to load data to a NoPI table than to a PI table.

SUMMARY

In various embodiments, techniques for fast loading data from an external distributed file system (DFS) to a DBMS are presented. According to an embodiment, a method for fast loading data from an external DFS to a DBMS is provided.

Specifically, a first number of clients are configured such that each client is configured to acquire a specific portion of data from an external distributed file system (DFS) file and configured to interact with a specific gateway of a database management system (DBMS). Additionally, gateways of the DBMS are configured such that each of the specific gateways is configured to pass the specific portion of data it has to every access module processor (AMP) controlled by that specific gateway. Finally, each AMP is configured to load a unique piece of the specific portion of data that it was passed to a table of the DBMS.

DETAILED DESCRIPTION

Initially for purposes of illustration and comprehension some context and examples are presented to highlight and illustrate the techniques being presented herein and below.

The techniques herein propose utilize the NoPI table feature of a DBMS and introduces new techniques for a data loading process to achieve an optimal loading performance from an external DFS to DBMS NoPI tables. In an embodiment, the external DFS is HDFS and the DBMS is the Teradata™ data warehouse product distributed by Teradata™ Inc. of Delaware.

Initially a description of how data is currently loaded to existing DBMS tables is provided for purposes of comprehension of what follows. When a row of data from a file is sent to a Fastload client module (or any client that uses a Fastload protocol such as the JAVA™ Fastload option) to Teradata (a specific example DBMS or data warehouse), the row is first sent to a gateway in a networked system. The gateway forwards the row to a receiving AMP, which is responsible for a loading session from which the row was sent, and then the receiving AMP computes a row-hash value of the row and sends it to the final AMP, which stores that row in Teradata Enterprise Data Warehouse (EDW). The final AMP and the receiving AMP can be two different AMPs and can be on two different nodes. The architecture for achieving the above process allows users to choose how many sessions (AMPs) to be used for data loading, which provides a way to control system resource usage for data loading. Teradata's™ NoPI feature leverages the existing Fastload protocol.

Existing DBMS's NoPI feature leverages existing Fastload protocols. So, a similar architecture to the conventional approach is used herein for loading to NoPI tables with two novel differences from loading to PI tables:

the receiving AMPs compute random row-hash values for NoPI tables; and there is no sorting needed on the final AMPs.

As will be demonstrated more completely herein and below, these differences provide substantial improvement during the loading process of an external DFS file to a DBMS table.

Figure 1A:
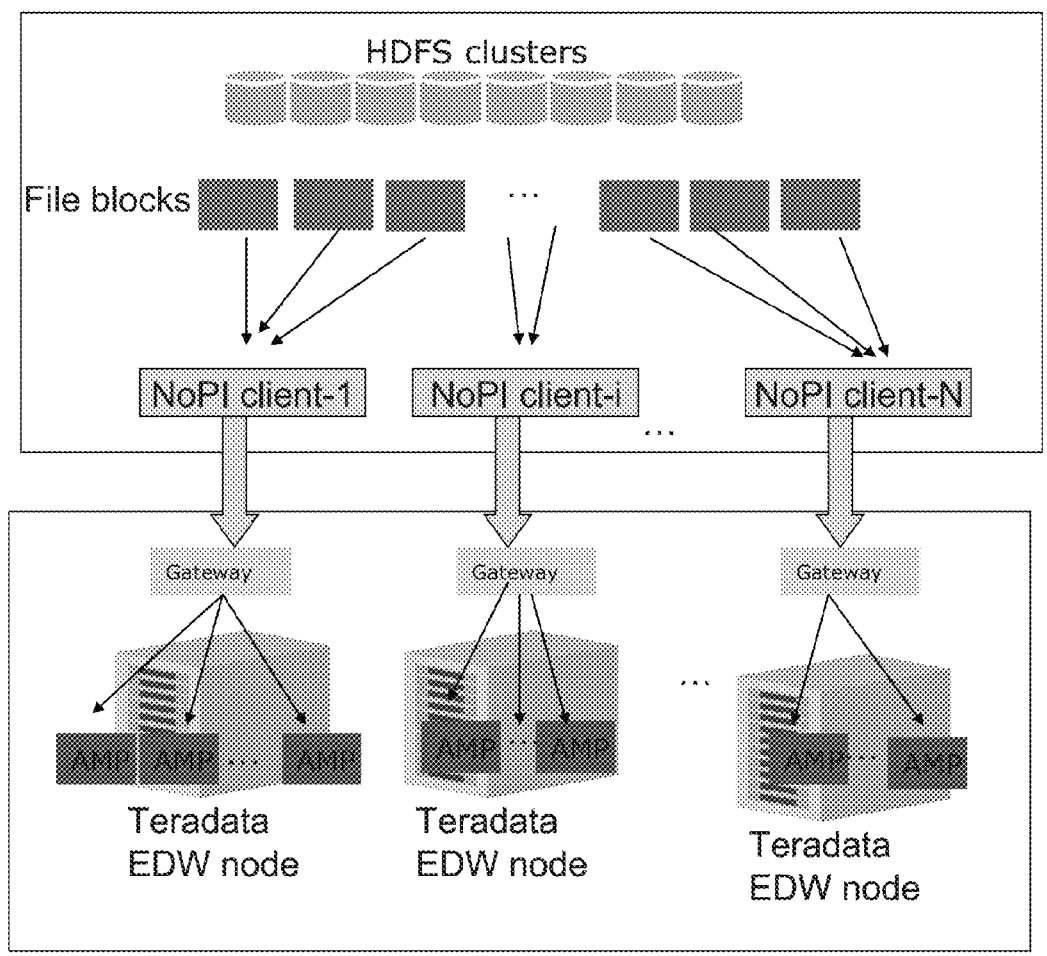
FIG. 1A is a diagram depicting an architecture for fast loading data from an external DFS (Hadoop™ DFS (HDFS)) to a DBMS (Teradata™), according to a specific embodiment.

The technique provide a new loading approach for loading external DFS (such as Hadoop™) data to NoPI tables (this new proposed architecture is shown in the FIG. 1A—it is noted this is presented within the context of HDFS and Teradata™ for illustration but other DFS's and other DBMS's may also be used with the techniques herein).

Essentially, the new and novel technique of the FIG. 1A shows that across node data transfer within the DBMS is eliminated during the loading processing.

The new loading processing, described in the context of the FIG. 1A, can be described as follows.

Assume there are N nodes in the Teradata EDW system (or any DBMS data warehouse) and a large Hadoop file F is being loaded into a NoPI table T.

1) For best loading performance, N loading clients are started as shown in the FIG. 1A. Each loading client is assigned 1/N of the Hadoop™ file F (or any external DFS file) and connects to a unique Teradata (or any DBMS) node/Gateway.

2) Each Gateway receives data only from one loading client and forwards data directly to all AMPs on the same node the Gateway resides. There is no Teradata node to Teradata node data transfer (DBMS node to DBMS node). Therefore, there is no Teradata inter node traffic in the whole loading process. Each Gateway forwards data to "local" AMPs in round-robin fashion to minimize data skew.

3) Loading restartability is at each loading client/Teradata node level. When one loading client fails, the loading client can be restarted and reload its assigned Hadoop™ data to the designated Teradata node.

Some enhancements can be achieved to the existing DBMS allowing a gateway capability to forward data directly to all AMPS on the same node that the Gateway resides on via a round-robin assignment fashion.

Additionally, enhancements to each client in the DBMS can be made t provide central coordination of N loading clients for loading Hadoop™ (external DFS) data to a NoPI table. A controller/master process is used to start up N loading clients; assign those clients the portion of the Hadoop™ (external DFS) data to be loaded and the gateway/Internet Protocol (IP) address to connect to, according to a user configuration file or default configuration parameters. To the user of the new loading utility, a simple command-line interface or graphical user interface (GUI) makes the loading process easy to start, monitor and manage. Per user configuration, the N loading clients can be started up on either a DBMS node or an external DFS node or any other node, which can connect to the external DFS and DBMS systems. Moreover, the restartability is built into each loading client.

So, a substantial benefit of the techniques herein is that data from an external DFS can be efficiently loaded to DBMS NoPI tables with fine granularity of restartability.

It is within this context that various embodiments are now discussed with reference to the FIGS. 1B-3.

Figure 1B:
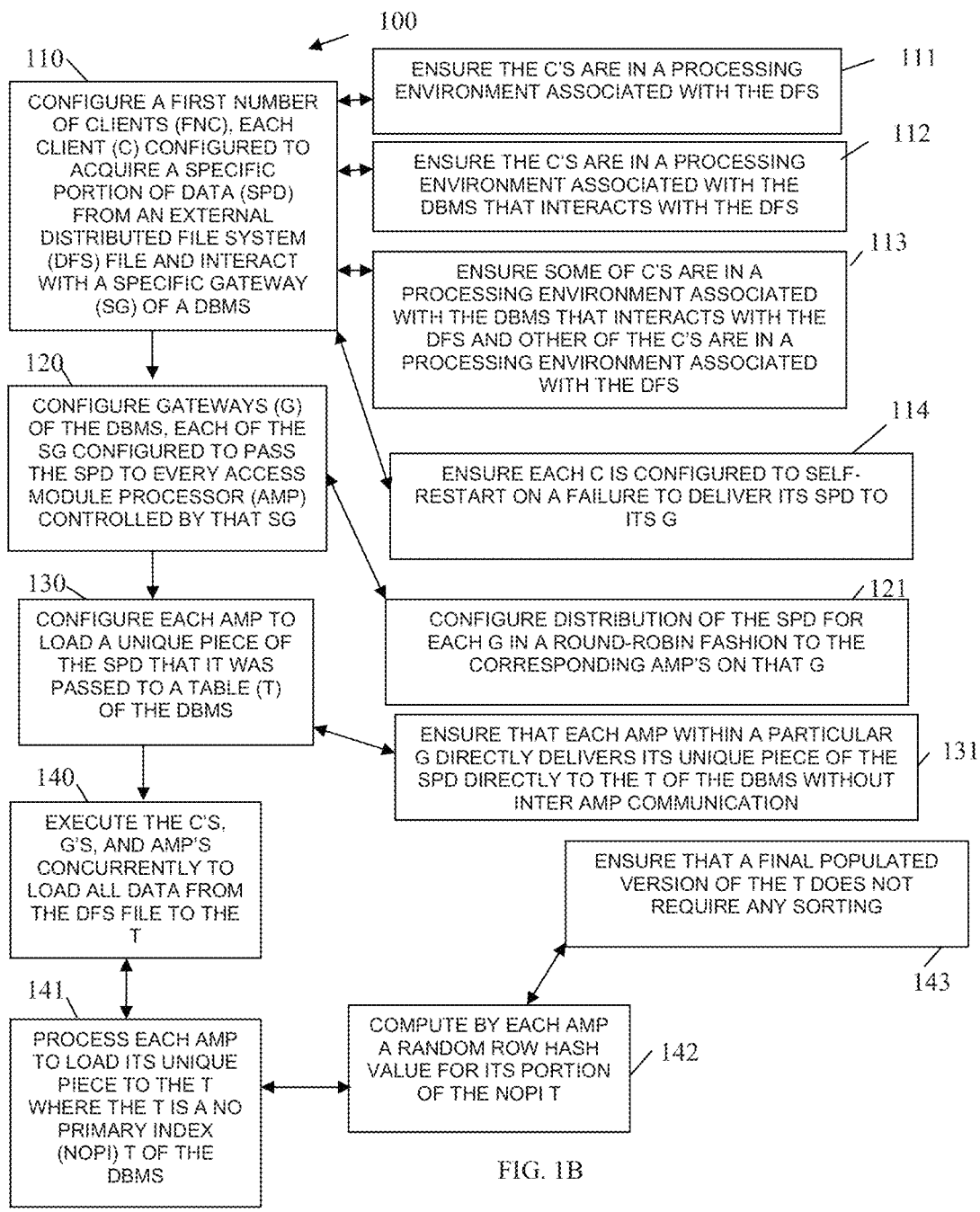
FIG. 1B is a diagram of a method for fast loading data from an external distributed file system to a parallel DBMS, according to an example embodiment.

FIG. 1B is a diagram of a method 100 for fast loading data from an external distributed file system to a parallel DBMS, according to an example embodiment. The method 100 (hereinafter "fast loader") is implemented as instructions within a non-transitory computer-readable storage medium that execute on one or more processors, the processors specifically configured to execute the fast loader. Moreover, the fast loader is programmed within a non-transitory computer-readable storage medium. The fast loader is also operational over a network; the network is wired, wireless, or a combination of wired and wireless.

At 110, the fast loader configures a first number of clients. Each client configured to acquire a specific portion of data from an external distributed file system (DFS) file and interact with a specific gateway of a database management system (DBMS). In other words if a particular file includes 1000 rows and there are 10 clients and 10 gateways, each client delivers 100 rows of the file to a specific gateway of the DBMS.

According to an embodiment, at 111, the fast loader ensures the clients are in a processing environment associated with the DFS. So, clients of the DFS, such as Hadoop™ are configured to acquire their specific portion of the data and communicate with a gateway associated with the DBMS.

In another case, at 112, the fast loader ensures that the clients are in a processing environment associated with the DBMS that interacts with the DFS. Here, unlike the embodiment of 111, the clients are configured to interact with an Application Programming Interface (API) of the DFS and the clients processing within the DBMS or are native to the DBMS.

In a hybrid approach, at 113, the fast loader ensures that some of the clients are in a processing environment associated with the DBMS that interacts with the DFS and other of the clients are in a processing environment associated with the DFS. Here, some processing is native to the DFS and some is native to the DBMS.

According to an embodiment, at 114, the fast loader ensures that each client is configured to self-restart on a failure to deliver its specific portion of data to its gateway. Each client can restart on failures to ensure High Availability (HA) and failover support.

At 120, the fast loader configures each of the gateways of the DBMS. So, each of the specific gateways are configured to pass the specific portion of data for that gateway to every access module processor (AMP) controlled by that specific gateway.

According to an embodiment, at 121, the fast loader configures distribution of the specific portion of data for each gateway in a round-robin fashion to the corresponding AMP's on that gateway. This was discussed above with reference to the discussion of the FIG. 1A and with the discussion that precedes the discussion of the FIG. 1B.

At 130, the fast loader configures each AMP to load a unique piece of the specific portion of data that it was passed to a table of the DBMS.

In an embodiment, at 131, the fast loader ensures that each AMP within a particular gateway directly delivers its unique piece of the specific portion of data directly to the table of the DBMS. That is, there is no inter AMP communication required within a specific gateway.

According to an embodiment, at 140, the fast loader executes the clients, gateways, and AMPs concurrently to load all data from the DFS file to the table.

Continuing with the embodiment of 140 and at 141, the fast loader processes each AMP to load its unique piece to the table where the table is a no primary index table of the DBMS.

Still continuing with the embodiment of 141 and at 142, the fast loader directs each AMP to computer a random row hash value for its portion of the no primary index table.

Continuing with the embodiment of 142 and at 143, the fast loader ensures that a final populated version of the table does not require any sorting.

Figure 2:
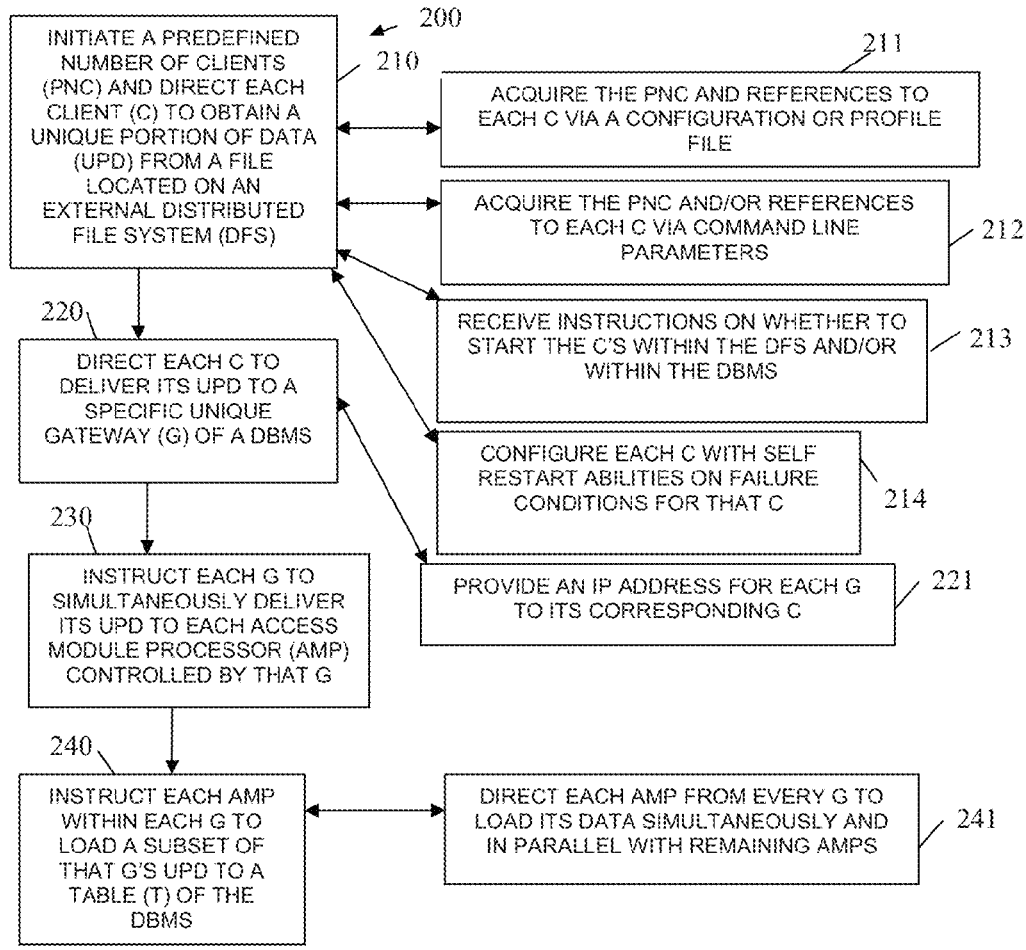
FIG. 2 is a diagram of another method for fast loading data from an external distributed file system to a parallel DBMS, according to an example embodiment.

FIG. 2 is a diagram of another method 200 for fast loading data from an external distributed file system to a parallel DBMS, according to an example embodiment. The method 600 (hereinafter "load manager") is implemented as instructions within a non-transitory computer-readable storage medium that execute on one or more processors, the processors specifically configured to execute the load manager. Moreover, the load manager is programmed within a non-transitory computer-readable storage medium. The load manager is also operational over a network; the network is wired, wireless, or a combination of wired and wireless.

The load manager presents yet another view of the processing discussed above with respect to the FIG. 1 and the fast loader.

At 210, the load manager initiates a predefined number of clients and directs each client to obtain a unique portion of data from a file located on an external DFS.

According to an embodiment, at 211, the load manager acquires the predefined number of clients and/or references to each of the clients via a configuration file or profile file.

In another case, at 212, the load manage acquires the predefined number of clients and/or references to each of the clients via command line parameters.

In an embodiment, at 213, the load manager receives instructions on whether to start each of the clients within a processing environment for the DFS and/or within a processing environment for the DBMS.

In another scenario, at 214, the load manager configures each client with self restart capabilities on failure conditions for that client.

At 220, the load manager directs each client to deliver its unique portion of the data to a specific unique gateway of a database management system (DBMS).

According to an embodiment, at 221, the load manager provides an Internet Protocol (IP) address for each gateway to its corresponding client.

At 230, the load manager instructs each gateway to simultaneously deliver its unique portion of the data to each access module processor (AMP) controlled by that gateway.

Finally, at 240, the load manager instructs each AMP within each gateway to load a subset of that gateway's unique portion of the data to a table of the DBMS.

According to an embodiment, at 241, the load manager instructs each AMP further directing each AMP from every gateway to load its data simultaneously and in parallel with remaining AMPs.

Figure 3:
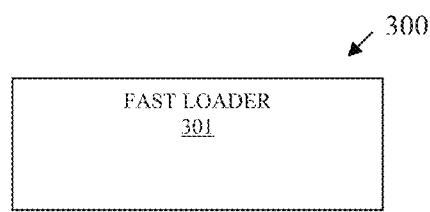
FIG. 3 is a diagram of fast data loading system, according to an example embodiment.

FIG. 3 is a diagram of fast data loading system 300, according to an example embodiment. The components of the fast data loading system 300 are implemented as instructions within a non-transitory computer-readable storage medium that execute on one or more processors of a parallel DBMS, the processors specifically configured to execute the fast data loading system 300. Moreover, fast data loading system 300 is programmed within a non-transitory computer-readable storage medium. The fast data loading system 300 is also operational over a network; the network is wired, wireless, or a combination of wired and wireless.

The fast data loading system 300 implements, inter alia, various aspects of the methods 100 and 200 presented above with respect to the FIGS. 1A, 1B, and 2, respectively.

The fast data loading system 300 includes a fast loader 301.

One or more processors of a DBMS are specifically configured with the fast loader 301 and the fast loader 301 is implemented as executable instructions that reside in a non-transitory computer-readable storage medium and execute on the one or more processors of the DBMS. Example aspects of the fast loader 301 were presented above with reference to the FIGS. 1A, 1B, and 2.

The fast loader 301 configures clients so that each client acquires a unique portion of data from a DFS file and each client communicates its unique portion of data to a specific gateway of the DBMS. The fast loader 301 also configures each gateway to deliver all of its unique portion of data to all access module processors on that gateway, and the fast loader 301 configures each AMP to load a subset of its unique portion of data to a table of the DBMS in parallel with remaining AMPs.

According to an embodiment, the fast loader 301 is further configured to configure each AMP to load its subset of the data to the table, which is a no primary index table that is unsorted in final version.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising:
   configuring a first number of clients, each client configured to acquire a specific portion of data from an external distributed file system (DFS) file and interact with a specific gateway of a database management system (DBMS);
   configuring gateways of the DBMS, each of the specific gateways configured to pass the specific portion of data to every access module processor (AMP) controlled by that specific gateway and each gateway receives its specific portion from a single external client associated with and processing the DFS; and
   configuring each AMP to load a unique piece of the specific portion of data that it was passed to a table of the DBMS.

2. The method of claim 1 further comprising, executing the clients, gateways, and AMPs concurrently to load all data from the DFS file to the table.

3. The method of claim 2, wherein executing further includes processing each AMP to load its unique piece to the table where the table is a no primary index table of the DBMS.

4. The method of claim 3, wherein processing further includes computing by each AMP a random row hash value for its portion of the no primary index table.

5. The method of claim 4, wherein computing further includes ensuring that a final populated version of the table does not require any sorting.

6. The method of claim 1, wherein configuring the first number of clients further includes ensuring the clients are in a processing environment associated with the DFS.

7. The method of claim 1, wherein configuring the first number of clients further includes ensuring the clients are in a processing environment associated with the DBMS that interacts with the DFS.

8. The method of claim 1, wherein configuring the first number of clients further includes ensuring some of clients are in a processing environment associated with the DBMS that interacts with the DFS and other of the clients are in a processing environment associated with the DFS.

9. The method of claim 1, wherein configuring the first number of clients further includes ensuring each client is configured to self-restart on a failure to deliver its specific portion of data to its gateway.

10. The method of claim 1, wherein configuring the gateways further includes configuring distribution of the specific portion of data for each gateway in a round-robin fashion to the corresponding AMP's on that gateway.

11. The method of claim 1, wherein configuring each AMP further includes ensuring that each AMP within a particular gateway directly delivers its unique piece of the specific portion of data directly to the table of the DBMS.

12. A method implemented and programmed within a non-transitory computer-readable storage medium and processed by one or more processors, the processors configured to execute the method, comprising:
   initiating a predefined number of clients and directing each client to obtain a unique portion of data from a file located on an external distributed file system;
   directing each client to deliver its unique portion of the data to a specific unique gateway of a database management system (DBMS), each specific unique gateway receiving its portion of the data from a single external client associated with and processing the external distributed file system;
   instructing each gateway to simultaneously deliver its unique portion of the data to each access module processor (AMP) controlled by that gateway; and
   instructing each AMP within each gateway to load a subset of that gateway's unique portion of the data to a table of the DBMS.

13. The method of claim 12, wherein initiating further includes acquiring the predefined number of clients and references to each client via a configuration or profile file.

14. The method of claim 12, wherein initiating further includes acquiring the predefined number of clients and/or references to each client via command line parameters.

15. The method of claim 12, wherein initiating further includes receiving instructions on whether to start the clients within the DFS and/or within the DBMS.

16. The method of claim 12, wherein initiating further includes configuring each client with self restart abilities on failure conditions for that client.

17. The method of claim 12, wherein directing further includes providing an Internet Protocol (IP) address for each gateway to its corresponding client.

18. The method of claim 12, wherein instructing each AMP further directing each AMP from every gateway to load its data simultaneously and in parallel with remaining AMPs.

19. A system, comprising:
   one or more processors of a parallel database management system (DBMS) configured with fast loader, the fast loader executing on the one or more processors; and
   wherein the fast loader configures clients so that each client acquires a unique portion of data from an external distributed file system (DFS) file and each client communicates its unique portion of data to a specific gateway of a database management system (DBMS), and each gateway receives its portion of data from a single external client associated with and processing the DFS, the fast loader also configures each gateway to deliver all of its unique portion of data to all access module processors on that gateway, and the fast loader configures each AMP to load a subset of its unique portion of data to a table of the DBMS in parallel with remaining AMPs.

20. The system of claim 19, wherein the fast loader is further configured to configure each AMP to load its subset of the data to the table, which is a no primary index table that is unsorted in final version.

* * * * *